United States Patent
Wolski et al.

(10) Patent No.: US 8,853,946 B2
(45) Date of Patent: Oct. 7, 2014

(54) METHOD FOR EVENT-BASED OVERRIDE STRATEGY FOR AUTOMATIC HIGH-BEAM CONTROL

(75) Inventors: Brian Wolski, Dearborn, MI (US); Timothy Prodin, Dearborn, MI (US); John Shutko, Ann Arbor, MI (US); Kenneth Michael Mayer, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 348 days.

(21) Appl. No.: 13/329,207

(22) Filed: Dec. 16, 2011

(65) Prior Publication Data

US 2013/0154477 A1 Jun. 20, 2013

(51) Int. Cl.
*B60Q 1/04* (2006.01)

(52) U.S. Cl.
USPC .......................................................... 315/82

(58) Field of Classification Search
USPC ............................. 315/76, 80, 77, 78, 81, 82
See application file for complete search history.

(56) References Cited

U.S. PATENT DOCUMENTS

| | | | |
|---|---|---|---|
| 2,890,386 A | 6/1959 | Matkins et al. | |
| 4,236,099 A | 11/1980 | Rosenblum | |
| 5,841,203 A | 11/1998 | Chambers et al. | |
| 6,711,481 B1 | 3/2004 | King et al. | |
| 6,947,576 B2 | 9/2005 | Stam et al. | |
| 7,625,107 B2 | 12/2009 | Brod | |
| 7,755,294 B2 | 7/2010 | Shelton et al. | |
| 7,759,819 B2 | 7/2010 | Michiyama et al. | |
| 2003/0123706 A1 | 7/2003 | Stam et al. | |
| 2006/0018512 A1 | 1/2006 | Stam et al. | |
| 2008/0129206 A1* | 6/2008 | Stam et al. | 315/82 |
| 2008/0246404 A1* | 10/2008 | Shelton et al. | 315/82 |
| 2009/0010494 A1* | 1/2009 | Bechtel et al. | 382/104 |
| 2010/0161177 A1* | 6/2010 | Yuter | 701/36 |

FOREIGN PATENT DOCUMENTS

| | | |
|---|---|---|
| EP | 1316475 A | 6/2003 |
| WO | WO 2006084536 A | 8/2006 |
| WO | WO 2007019954 A | 2/2007 |

* cited by examiner

*Primary Examiner* — Minh D A
(74) *Attorney, Agent, or Firm* — Angela M. Brunetti; Frank MacKenzie

(57) ABSTRACT

A system and method for re-enabling automatic mode after manually overriding automatic mode of an automatic headlamp control system for a motor vehicle. The system and method monitors the headlamp state in a controller, recommends a headlamp state from the automatic mode of the automatic headlamp control system, monitors a driver request for headlamp state in the controller, and causes the controller to return to the automatic mode when the recommended headlamp state matches the driver request for a headlamp state.

9 Claims, 3 Drawing Sheets

METHOD FOR EVENT-BASED OVERRIDE STRATEGY FOR AUTOMATIC HIGH-BEAM CONTROL

TECHNICAL FIELD

The inventive subject matter relates to an automatic high-beam control system that controls switching of a vehicle's headlamps between low beam and high beam settings and more particularly to a system and method for reinstating automatic high-beam control after a manual override of an automatic high-beam control system.

BACKGROUND

Automatic headlamp systems are commonly used within automotive vehicles to automatically control the function of the vehicle's headlamps based upon the operating state of the vehicle, an ambient light level and a traffic environment or scene outside of the vehicle. An automatic headlamp system that also controls the high and low beam state of the headlamps has the added advantage of relieving a driver of the distraction of having to switch between low-beam and high-beam settings allowing the driver to focus on the task of driving the vehicle. In particular, an automatic high-beam control system is designed to automatically dim the headlamps from high-beam to low-beam in the presence of lights from an oncoming or preceding vehicle.

Numerous automatic headlamp control systems described above have been developed and implemented. However, these systems have drawbacks in that a driver may be unable to override a command or activation of the system and the driver must deactivate the automatic headlamp control system in order to input their own desired headlamp state. In other solutions, a driver override mechanism is implemented but it may be a permanent state that requires the driver perform another, separate action to re-enable automatic control of the headlamp system. Both of these known systems detract from the purpose of the automatic headlamp system, which is to avoid distracting the driver. In still another solution, the driver override mechanism is based on a timer value which re-enables the high-beams upon expiration of the timer. A drawback to this solution is that the timeout value does not take into account subsequent events and therefore, the arbitrary timeout of the override timer may cause the high-beams to be re-enabled or turned off during a driving condition that is not desired by the driver.

There is a need for an override strategy for an automatic high-beam control system which allows the driver to override a command or activation of the system (i.e., turning high-beams on or off), yet re-enables automatic control of the system in an intuitive manner thereby avoiding drawbacks associated with known automatic headlamp systems.

SUMMARY

The inventive subject matter provides a system and method for event-based override of an automatic high-beam control system that allows the driver to override the automatic control system; yet automatic high-beam control is intuitively and automatically reactivated at a period when the driver would expect it, without any additional action being required on the part of the driver. The inventive subject matter modifies automatic control of the headlamp system to incorporate a driver's override condition, yet maintains the benefit of the automatic control system by re-enabling the automatic control when a command or recommendation of the control system matches that of the driver's override selection.

In one embodiment of the inventive subject matter, an automatic mode for a headlamp control system is re-enabled after the automatic mode has been manually overridden. The system and method monitors the headlamp state in a controller, recommends a headlamp state from the automatic mode of the automatic headlamp control system, monitors a driver request for headlamp state in the controller, and causes the controller to return to the automatic mode when the recommended headlamp state matches the driver request for a headlamp state In another embodiment of the inventive subject matter, a controller recommends a headlamp state from an automatic headlamp control system. The controller monitors the headlamp state, the recommended headlamp state and a driver input headlamp state. The inventive subject matter causes the controller to temporarily change from the automatic mode to a manual mode when a driver inputs a headlamp state that conflicts with the recommendation from the automatic mode and causes the controller to return to an automatic mode when a recommended headlamp state from the automatic mode matches the driver input for a headlamp state.

DESCRIPTION OF INVENTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
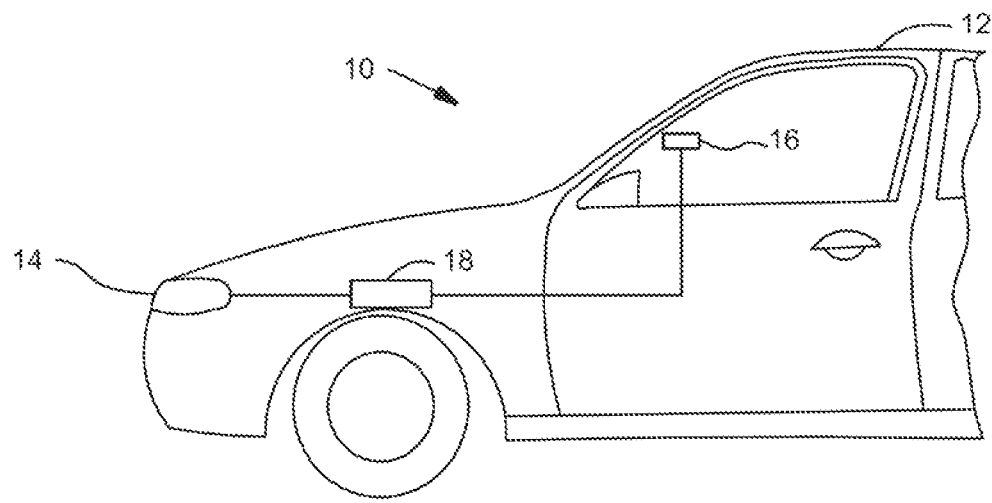
FIG. 1 is a partial view of a vehicle incorporating an automatic headlamp control system in accordance with the inventive subject matter.

FIG. 1 illustrates an automatic headlamp control system 10 that is mounted to a vehicle 12 for automatically controlling the actuation of high and low beams in the vehicle's headlamps 14. The automatic headlamp control system 10 has a sensor 16 coupled to a headlamp control module 18 which is coupled to the headlamps 14 for controlling their on/off and high/low beam operation. The sensor 16 is preferably mounted in a position where it senses an undistorted view ahead of the vehicle. This may be through the vehicle windshield as shown in FIG. 1. For example, sensor 16 may be mounted in a rear view mirror or mirror mount. In other embodiments, not shown, the sensor may be mounted directly to the windshield or in or around the headlamp. The sensor 16 is calibrated such that the sensor 16 collects light emanating from a light source from an oncoming or preceding vehicle, yet is prevented from responding to spurious light signals from non-automotive light sources. Consequently, reflected light signals from such things as roadside signs, guard rails, and reflectors which may be similar in spectrum to automotive light sources are optically filtered out and ignored by the sensor control module 16. This may be accomplished using a silicon photodetector as a light sensor, encapsulating the silicon photodetector in an epoxy material that has been doped so as to be opaque to visible light and transparent to infrared light. Other means of achieving the desired filtering are also possible, such as the use of optical bandpass filters. The sensor 16 may also include an ambient light sensor for collecting ambient light. The sensor 16 may also be a camera. The sensor 16 may also comprise a combination of one or more sensors and cameras strategically positioned on the vehicle in one or more locations. One skilled in the art is capable of configuring and employing a suitable sensor 16 without departing from the scope of the inventive subject matter.

The controller 18 is coupled to the headlamps 14, the sensor 16 and a plurality of switches 20-24 (not shown in FIG. 1) for switching between headlamps on/off, high beams on/off, automatic and manual control of the headlamp operation. The controller 18 may be coupled to or may be incorporated into a standard network bus, such as a vehicle CAN bus.

Figure 2:
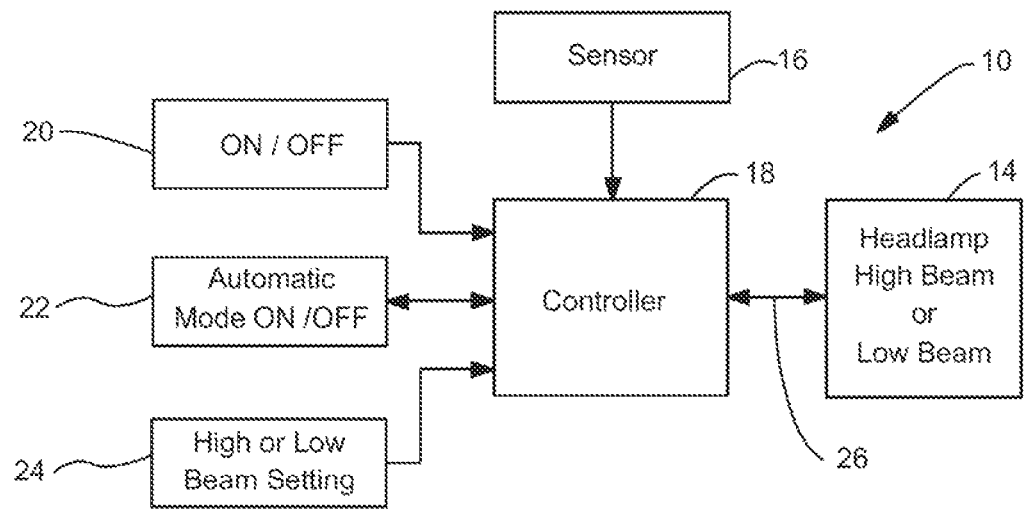
FIG. 2 is a schematic diagram of an automatic headlamp control system incorporating automatic headlamp control and override of automatic headlamp control according to the inventive subject matter.

Referring to FIG. 2, a schematic block diagram of a headlamp control system incorporating automatic headlamp control and override of automatic headlamp control 10 according to the inventive subject matter is shown. A main headlamp control switch 20 manually controls the "on" and "off" selection of the vehicle headlamps 14 by way of the controller 18. An automatic headlamp control mode switch 22 is in communication with the controller 18. When automatic headlamp control is not "on", the system is in a manual mode of operation. Further, manual selection of either high beam or low beam output of the headlamps may be made manually by the driver using a switch 24 that is also in communication with the controller 18. A control signal 26, output from the controller 18, controls the selection between low beam output and high beam output at the headlamps 14. The driver overrides automatic mode by using switch 24 to directly control the headlamps, regardless of the setting of automatic mode and regardless of the output of the headlamps in automatic mode. The control module 18 continuously monitors the sensor 16 information, the state of the headlamps 14, the automatic mode switch 22 setting, and the driver input from switch 24.

As discussed above, headlamp 14 operation may be operable manually or automatically. In a manual mode, the driver turns the headlamps on manually using switch 20 and selects either low beam or high beam operation as desired using switch 24. When the automatic headlamp control feature is activated via switch 22, i.e., the system 10 will automatically turn the headlamps "on" and "off" and automatically switch between low beams and high beams when the headlamps are "on". When the system 10 is operating in the automatic mode, the headlamps 14 are turned "on" and "off" automatically based on the level of ambient light outside of the vehicle as determined by the sensor 16. The automatic headlamp control feature 18 may or may not require a separate activation. The system 10 also provides automatic switching between the low beam state and the high beam state based upon detection that either the low beam state or high beam state is active, the level of the light and the forward scene detected by the sensor 16. When the automatic mode is active, and the headlamps are in a low beam state, should sensed conditions warrant high beams, the system will automatically turn the high beams "on". When the automatic mode is active, and the headlamps are in a high beam state, should sensed conditions warrant low beams, the system will automatically turn the high beams "off".

The driver can override the automatic mode, without turning the automatic mode "off", by manually selecting a state, either high beam or low beam, using switch 24, that does not agree with a head lamp state recommended by the headlamp control system 10 in automatic mode. The manual switch 24 to set the high or low beam state overrides any automatic mode recommendation while the headlamp control system 10 is set to automatic mode. In prior art systems, this action either causes automatic mode to end indefinitely until it is reset by the driver, or the override setting may be tied to a timer whereupon time-out of the timer, automatic mode is reinstated. This typically occurs after a predetermined time has elapsed. According to the inventive subject matter, the automatic control system is re-enabled when a command or recommendation from the control system 10 matches that of the driver's action, thereby reinstating automatic mode at an appropriate time and avoiding drawbacks associated with known systems. The inventive subject matter addresses transitions between override and automatic control from which the driver's commands are decoded by the automatic control system.

For override from high beams "off" to high beams "on": if the driver wishes to turn the high beams "on" when the automatic control system has recommended the high beams "off", the driver must use switch 24 to cause controller 18 to send a signal 26 to turn the high beams "on". According to the inventive subject matter, the high beams will remain "on" until one of two events occurs. Either (1) the driver manually turns "off" the high beams, at which time the automatic control system and the driver are in agreement and automatic control is re-enabled, or (2) the automatic control system 10 senses conditions that warrant the high beams "on", at which time the output of the automatic control system and the input from the driver are, again, in agreement and automatic control is re-enabled.

For override from high beams "on" to high beams "off": If the driver wishes to turn the high beams "off" when the automatic control system 10 has recommended the high beams "on", the driver must move the switch 24 to cause controller 18 to output a signal 26 to turn the high beams "off". The high beams will remain "off" until one of two events occurs. Either (1) the driver switches back to high beams "on" at which time the driver and the automatic control system are in agreement and automatic control is re-enabled, or (2) the automatic control system 10 recommends, based on sensed conditions, that high beams should be "off", at which time the automatic control system 10 and the driver input 24 are again, in agreement and automatic control is re-enabled.

Figure 3:
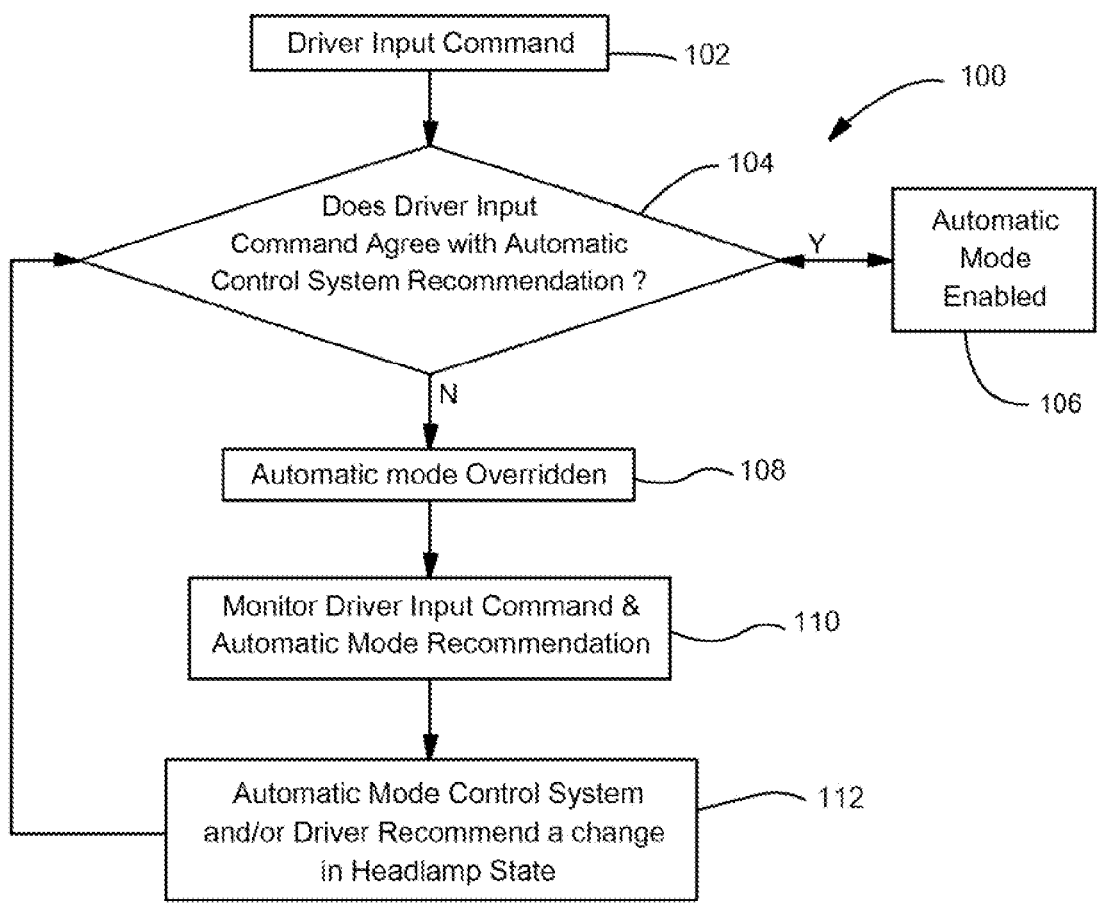
FIG. 3 is a flow chart of a method for controlling an automatic headlamp control system according to the inventive subject matter.

FIG. 3 is a flow chart of the method 100 of the inventive subject matter. The inventive subject matter applies to automatic headlamp control that is set to automatic mode and that is being overridden by a driver requested input. Therefore, the initial stages of the flow chart begin for conditions under which the automatic headlamp control is already active. According to the method 100 of the inventive subject matter, the driver inputs a command 102. The method determines 104 whether the state of the headlamps is in agreement with the driver requested headlamp state. If the driver input 102 is in agreement with the recommendation from the automatic headlamp control system, the automatic mode remains enabled 106. However, if the driver input 102 is opposite that of a recommendation from the automatic headlamp control system, then the automatic control system recommendation is overridden 108 and the headlamps are set to the state requested by the driver. For example, the automatic headlamp control system senses conditions and makes a recommendation, turning, the high beams "on", yet the driver wants to override the automatic headlamp system recommendation by requesting the high beams be "off". The driver manually inputs a command to turn the high beams "off". The controller activates the headlamps according to the driver commanded input thereby overriding automatic control system recommendation for the state of the headlamps and temporarily suspending automatic control of the headlamps. In the example being provided herein, the headlamps are switched to the low beam state. The controller keeps the headlamp setting to the setting desired by the driver's override command and continues to monitor 110 the headlamp state and sensor information provided to the automatic control system. The controller also continues to provide recommendations 112 for headlamp state based on the sensed conditions. The automatic control system also monitors 110 the driver request or input command, as well as the sensor information, until a point in time at which either the automatic control system or the driver provide an input to the headlamp control system that will result in a change to the headlamp state. Upon this event, the method will again determine whether the driver request or input command matches 104 the recommended state of the automatic control system. Upon a match of the automatic control system recommendation and the driver input command, the automatic control of the headlamps is reinstated 106.

For example, while the automatic headlamp control system has turned the high beams "on", the driver may turn the high beams "off" manually, thereby conflicting with the recommendation from the automatic headlamp control system. When the automatic headlamp control system agrees with the driver selection, i.e., due to detection of an oncoming vehicle headlamps by sensor 16, the system is switched back into automatic mode without any further operation on the part of the driver. In another example, the automatic control system may sense conditions that warrant the high beams be turned "off", i.e., the presence of an oncoming vehicle may be sensed. In this example, the driver's subsequent manual input of the high beams "on" conflicts with the control systems recommendation, thereby resulting in the automatic headlamp control system switching into manual mode. The automatic mode will be restored when the system determines that high beam usage is recommended, i.e., when no other automotive lamps are sensed in the forward scene.

Figure 4A:
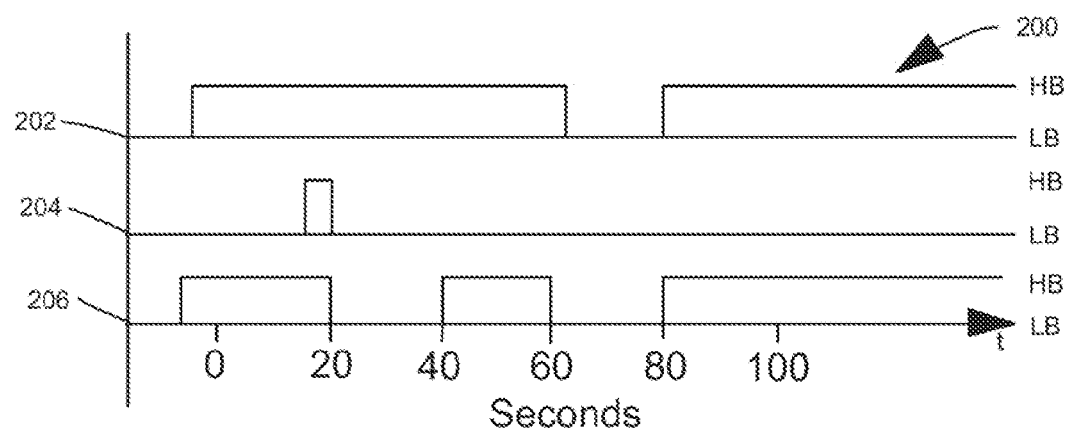
FIGS. 4a-4c are graphs comparing outputs from two known automatic headlamp control systems as shown in FIGS. 4a and 4b, with the automatic headlamp control system according to the inventive subject matter shown in FIG. 4c Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.
Figure 4B:
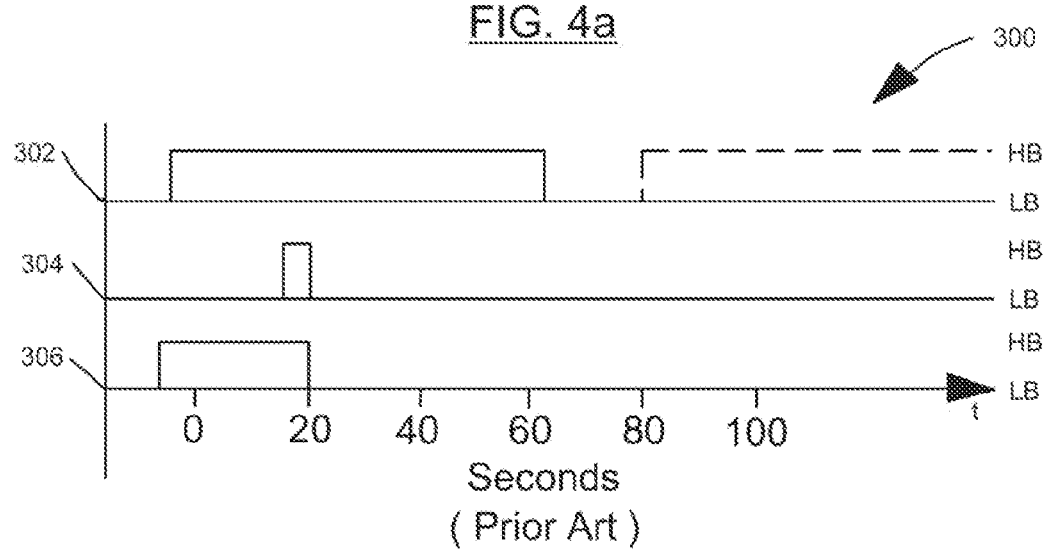
Figure 4C:
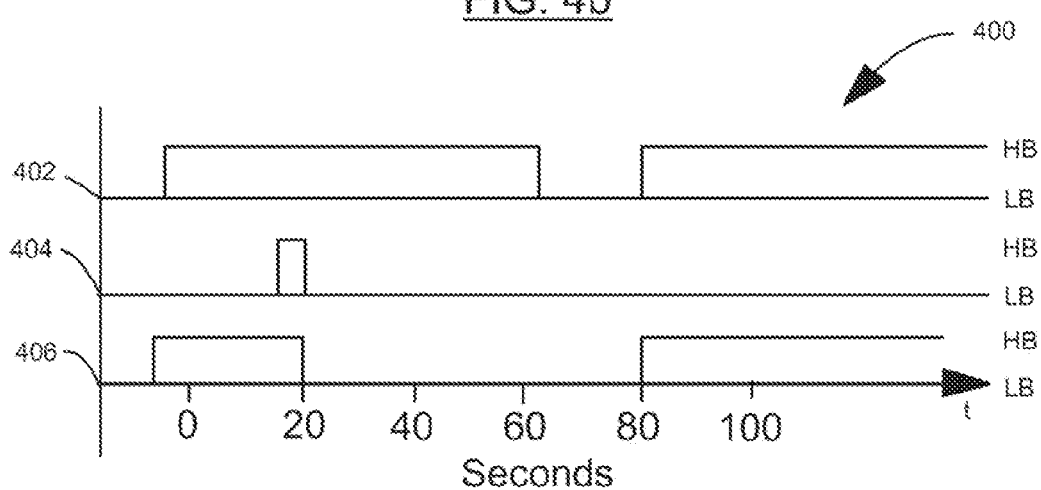

FIGS. 4a-4c are graphs comparing outputs from two known automatic headlamp control systems as shown in FIGS. 4a and 4b, with the automatic headlamp control system according to the inventive subject matter shown in FIG. 4c. FIG. 4a shows an example output 200 for a time-dependent automatic headlamp control system. The system recommendation 202 starts out by recommending high beam output 206 wherein the high beams are "on". At t=20 sec., the driver input 204 overrides the system recommendations by turning off the high beams, as reflected in the high beam output 206 at t=20 sec. In this known system, the high beam output remains "off" until a predetermined time has elapsed, in this case, t=40 sec., at which time, the system automatically returns to its recommended output of high beams active, as shown in the high beam output 206 at t=40 sec. A drawback associated with this method is that the system will reactivate the high beam output upon expiration of the predetermined time, whether or not the driver desires a high beam setting. The risk is that the automatic headlamp control system will automatically adjust the headlamp setting even if it does not match the driver's requested headlamp setting. However, because the automatic mode is reinstated, at t=80 sec., when the system recommends that high beams become active again, the automatic headlamp control system reactivates the high beams.

FIG. 4b shows an example output 300 for a switch-dependent automatic headlamp control system. The system recommendation 302 starts out by recommending high beam output 306 wherein the high beams are "on". At t=20 sec., the driver input 304 overrides the system recommendations by turning off the high beams, as reflected in the high beam output 306 at t=20 sec. However, in this switch-based automatic headlamp control system, the automatic control operation is not resumed until the driver reactivates the automatic headlamp control. Therefore, at t=80 sec. the system is recommending high beams reactivate. However, because the automatic control has been disabled through the action of the driver's override input and the driver has not reinitiated automatic control, the high beams remain "off".

FIG. 4c shows an example output 400 for the automatic headlamp control system of the inventive subject matter. The automatic control system 402 starts out by recommending high beam output. At t=20 sec. the driver overrides the automatic control system by requesting the high beams be turned "off". At t=60 sec., the automatic headlamp control system 402 of the inventive subject matter senses conditions that warrant the high beams be turned off, at which time, the driver requested output 404 matches the recommendation 402. Because the driver input 404 matches that of the automatic control system recommendation 402 at t=60 sec., the automatic control is reinstated. Therefore, at t=80 sec. the automatic control system 402 senses conditions that warrant high beams become active again, and the automatic control system activates the high beam output again without any further action on the part of the driver.

The inventive subject matter avoids the drawbacks associated with known override of automatic headlamp control systems in that it intuitively determines an appropriate time during headlamp control to reactivate automatic control of the headlamp system. By reinstating automatic headlamp control at a point in time when the automatic control system recommendation matches that of the driver's requested input, the automatic control system avoids distracting the driver. Prior art systems either distract the driver by turning high beams back on after a predetermined time has elapsed whether the driver wants the high beam output or not or they require the driver to remember to manually reactivate the automatic control system to again gain the benefit of automatic headlamp control.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, yet may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for resuming automatic mode of a headlamp control system, the method comprising the steps of:
    monitoring a headlamp state in the headlamp control system;
    recommending a headlamp state from an automatic mode of the headlamp control system;
    monitoring a driver input for a headlamp state to the headlamp control system;
    causing a controller to temporarily change from the automatic mode to a manual mode when a driver inputs a headlamp state that conflicts with the recommendation from the automatic mode; and
    causing the controller to return to an automatic mode when a recommendation for a headlamp state from the automatic mode matches the driver input for a headlamp state.

2. The method as claimed in claim 1 wherein the controller operates the headlamp state as input by the driver and remains in the manual mode while the driver input for a headlamp state conflicts with the recommendation from the automatic mode.

3. The method as claimed in claim 1 wherein the headlamp state is a high beam state or a low beam state.

4. A system for switching between manual and automatic control of a vehicle headlamp system that controls a headlamp state of illumination, the system comprising:
    a controller for controlling and monitoring a state of illumination of a vehicle headlamp system;
    a sensor coupled to the controller, the sensor for detecting illumination characteristics of a forward view of a vehicle headlamp system and providing an input to the controller, wherein the controller automatically controls a state of illumination for the vehicle headlamp system based on the sensor input;
    an input device coupled to the controller for inputting a state of illumination that manually overrides automatic control of the state of illumination; and
    the controller transitioning back to automatic control when the automatically controlled state of illumination matches the manually overridden input state of illumination.

5. The system as claimed in claim 4 wherein the controller operates the headlamp system according to the input device while the state of illumination from the input device conflicts with a state of illumination controlled by the automatic control.

6. The system as claimed in claim 4 wherein the state of illumination is a high beam state or a low beam state.

7. A method for re-enabling automatic mode after manually overriding automatic mode of an automatic headlamp control system for a motor vehicle, the method comprising the steps of:
    monitoring headlamp state in a controller;
    recommending a headlamp state from the automatic mode of the automatic headlamp control system;
    monitoring a driver request for headlamp state in the controller; and
    causing the controller to return to the automatic mode when the recommended headlamp state matches the driver request for a headlamp state.

8. The method as claimed in claim 7 wherein the controller operates the headlamp system according to the driver request for headlamp state while the driver request for headlamp state conflicts with a recommended headlamp state.

9. The method as claimed in claim 7 wherein the headlamp state is a high beam state or a low beam state.

* * * * *